United States Patent [19]

de Larosiere

[11] Patent Number: 4,706,924
[45] Date of Patent: Nov. 17, 1987

[54] STACK MOLD

[76] Inventor: Pierre J. de Larosiere, 30 Duque de Palmela, 4C, 1200 Lisbon, Portugal

[21] Appl. No.: 599,980

[22] Filed: Apr. 13, 1984

[51] Int. Cl.$^4$ ............... B29C 33/04; B29C 45/43; B29C 45/66

[52] U.S. Cl. ................... 249/161; 425/190; 425/411; 425/437; 425/438; 425/547; 425/556

[58] Field of Search ............ 425/338, 588, 411, 437, 425/190, 572, 542, 436 R, 438, 547, 556, 558; 249/119, 129, 126, 130, 131, 160, 161; 264/243

[56] References Cited

U.S. PATENT DOCUMENTS

| | | | |
|---|---|---|---|
| 653,235 | 7/1900 | Gray | 249/129 X |
| 3,357,058 | 12/1967 | Kutik | 425/588 |
| 3,467,990 | 9/1969 | Kutik et al. | 264/243 |
| 3,838,460 | 10/1974 | Lovejoy | 425/438 |
| 4,025,268 | 5/1977 | Taylor | 425/437 |
| 4,345,965 | 8/1987 | Lindenmayer et al. | 425/588 |
| 4,472,127 | 9/1984 | Cyriax et al. | 264/328.7 |

Primary Examiner—Willard E. Hoag
Attorney, Agent, or Firm—Dennis H. Lambert

[57] ABSTRACT

A stack mold having a pair of mold halves movable toward and away from another along an axis of movement and in which a plurality of mold plates are arranged parallel to one another between the mold halves and parallel to the axis of movement of the mold halves. This arrangement of the mold plates enables a larger number of large, thin parts to be simultaneously molded in a given size press than is possible in the prior art. Further, the mold plates are formed with hangers which support the mold plates on the mold halves, enabling different mold plates to be easily substituted without disassembling the mold structure and slides, and also eliminating the need for guide pins or pillars for the mold plates. The mold plates are supported on program plates having guide surfaces thereon for determining the opening and closing sequence of the mold plates during opening and closing movement of the mold press, and the central portion of the endmost mold plates is wedge-shaped. This structure also eliminates the need for guide pins or pillars for the mold plates.

18 Claims, 9 Drawing Figures

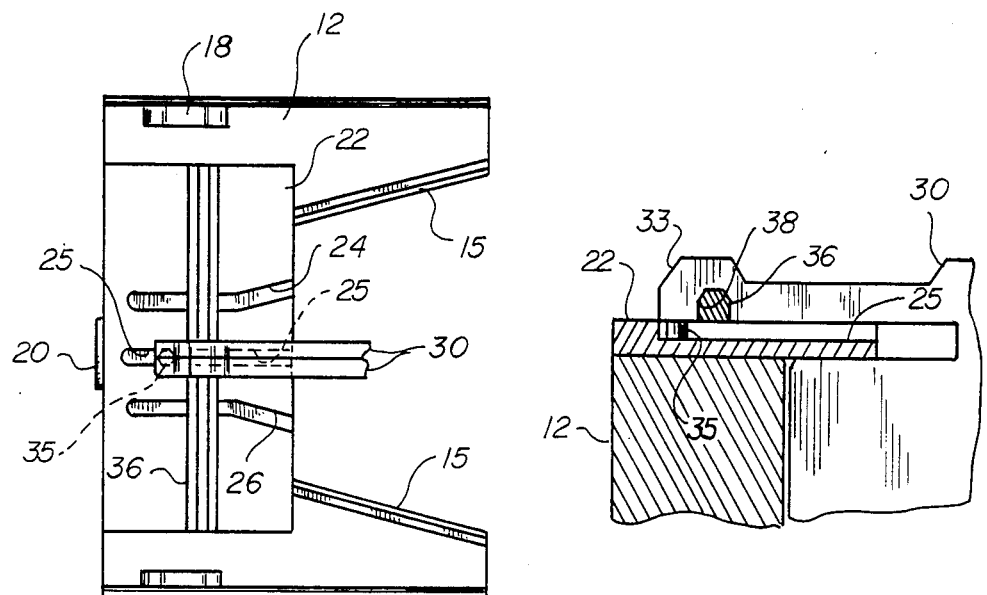
FIG 8
FIG 9
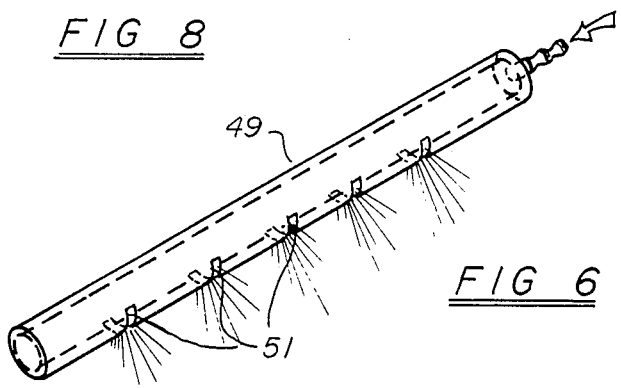
FIG 6
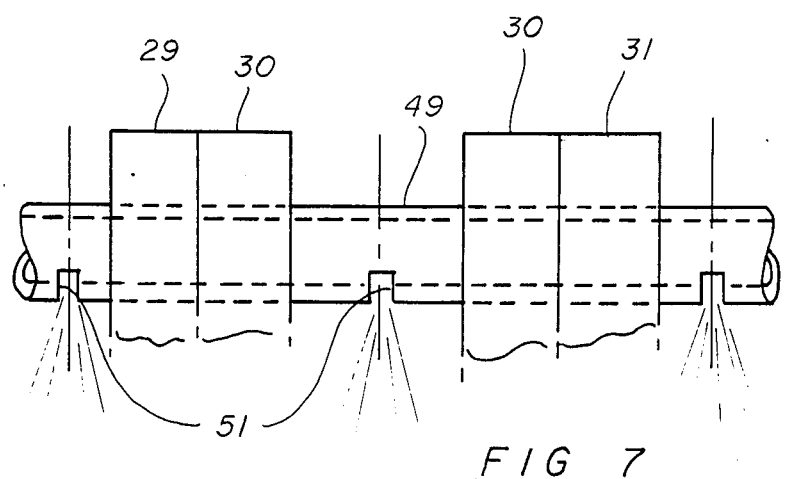
FIG 7

STACK MOLD

BACKGROUND OF THE INVENTION

1. Field of the Invention:

This invention relates generally to injection molds. More particularly, the invention relates to stack molds in which a number of mold plates are arranged between the press platens for simultaneously molding a number of parts.

2. Prior Art:

Injection molding has heretofore been based upon the theory that the part to be molded should be placed in the mold such that the main molding surfaces are in planes parallel to the platens of the press. This has been due to the belief that the clamping force of the press should be utilized to close the mold in the same plane or direction as the closing direction of the press. As a result, the area available for molding is limited to the area of the platens existing between the columns of the press.

An improvement over this limitation was accomplished with stack molds, in which two or more pairs or layers of mold plates are placed between the platens generally parallel thereto. While this arrangement increases the molding capacity of the presses, especially for flat parts, it is still restricted since injection devices must be used which penetrate the part being molded in order to reach all of the cavities to be filled. This eliminates use of such stack molds for a large number of parts that do not have openings permitting such penetration. Further, such systems require that the injection device be withdrawn to permit removal of the part. Moreover, there is a limit to the distance the molten material can be conveyed away from the nozzle of the press and still permit a thermally balanced distribution of the plastic into each cavity level. As a result of these limitations, very few stack molds have been successfully built with more than two levels of injection.

Prior art molds are further limited in their capacity because of the requirement for observing a limiting ratio between the surface of the part to be molded and the clamping force of the press. The projected surface of the part dictates the force required to keep the mold closed during the injection, regardless of how thin or light-weight the part may be.

Up to now, basically flat, thin-wall and relatively light-weight parts such as discs, lids, trays, partitions, hangers, plates, cutlery, frames, etc., have been produced in small quantities compared to the injection capacity of the press utilized. This normally results in high production costs and has therefore made injection molding an expensive process for a large number of parts which should otherwise be economical to manufacture. There is thus a need for molds capable of producing as great a number of parts as the injection press has the capacity to produce.

PURPOSE OF THE INVENTION

Accordingly, it is a principal object of this invention to provide an injection mold having means for enabling a larger number of large, flat parts to be simultaneously molded than is possible with prior art devices.

Another object of this invention is to provide an injection mold in which a plurality of mold plates are arranged substantially perpendicular to the planes of the press platens.

A further object of this invention is to provide an injection mold in which the mold plates are supported in the mold by hangers, enabling one or more of the mold plates to be removed without requiring disassembly of the mold halves and slides.

A still further object of this invention is to provide an injection mold having means for supporting and guiding the mold plates such that the need for guide pins or pillars for the mold plates is eliminated.

Yet another object of this invention is to provide an injection mold in which the mold plates are arranged perpendicular to the planes of the press platens, and the endmost mold plates are wedge shaped, ensuring that the mold plates "home" into their exact location when the mold closes, thus eliminating flash and without requiring the use of guide pins or pillars.

A further object of this invention is to provide an injection mold in which ejectors may be located at any desired points of the part and on both sides if necessary, without causing interference with other parts of the mold.

A still further object of this invention is to provide an injection mold in which the mold plates are supported by hangers on program plates having guide surfaces thereon for determining the opening and closing movement of the mold plates as the mold opens and closes, eliminating the need for guide pins or pillars.

Another object of this invention is to provide an injection mold in which the mold plates are "free floating" and are hung on slide bars resting on program plates on the top and bottom of each mold half, the program plates serving as wear plates for the slide bars and having guide surfaces for determining the opening and closing motion of the mold plates.

SUMMARY OF THE INVENTION

These and other objects and advantages of the invention are accomplished by the mold as described and illustrated herein. The mold includes a pair of mold halves (bolsters) carried by the platens of the press for movement along an axis of movement toward and away from one another. A plurality of mold plates are arranged parallel to one another and to the axis of movement of the mold halves and perpendicular to the planes of the press platens. The mold plates are formed with hangers which support the mold plates on slide bars resting on top of program plates, and the program plates have guide surfaces thereon which determine the opening and closing movement of the mold plates as the mold halves open and close. The endmost mold plates are wedge shaped so that the mold plates "home" into their exact location as the mold halves close. Since there is nothing to interfere with them, ejectors may be provided at any suitable point of the part and on both sides if desired. The ejectors are operated by compressed air and vacuum, and are controlled via a venturi which enables the operator to program each level of ejectors individually as required for each part. Also, the ejectors may be caused to pulsate and may be operated in any desired sequence by alternating compression and vacuum through the venturi. An air jet is positioned to direct a fan of air into the space between mold plates, slicing or stripping the part away at the end of a molding cycle and accelerating its fall away from the mold plates. Further, channels are engraved in the back of each plate, providing a large surface area permitting fast and optimal temperature exchange at the points and times needed. Adjustable channels are provided to control the temperature at individual sectors of the plates. Venting of the mold is accomplished via the channels serving the ejector system, in which the vacuum applied to the ejectors during an injection cycle is communicated to the mold cavity to vent it.

BRIEF DESCRIPTION OF THE DRAWINGS

Further advantages of the invention will become apparent from the following detailed description and the accompanying drawings, in which like reference characters designate like parts, and wherein:

FIG. 6 is a perspective view of the air jet tube for introducing a fan shaped air blast into the mold cavity at the end of an injection cycle;

FIG. 7 is a somewhat schematic view of several mold plates, shown separated, and the air jet tube associated therewith;

FIG. 8 is a top plan view of one mold half, showing the program plate on top thereof, with a slide bar and one pair of mold plates supported thereby; and FIG. 9 is an enlarged view in section, taken along line 9—9 in FIG. 8.

DESCRIPTION OF THE PREFERRED EMBODIMENTS

Figure 1:
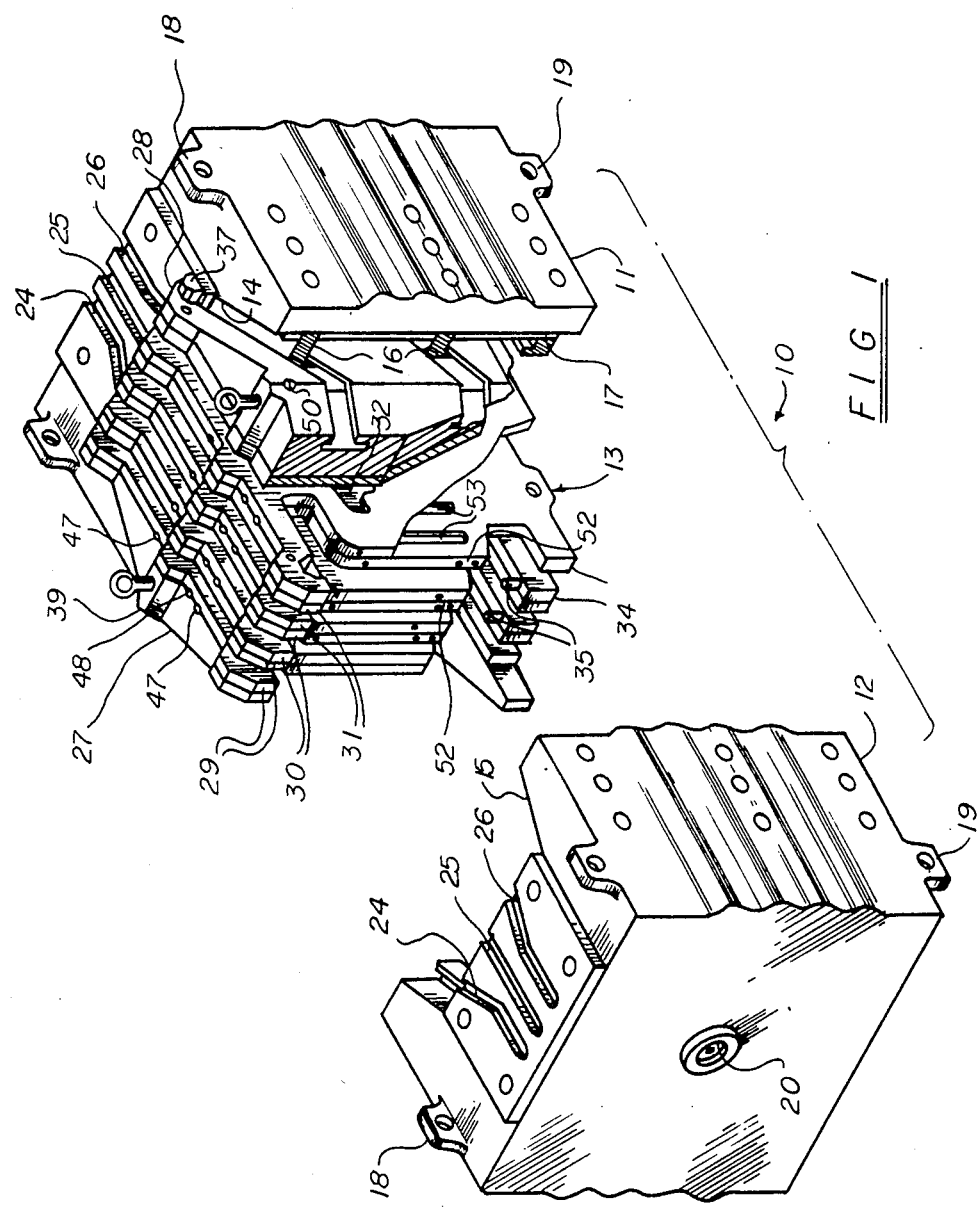
FIG. 1 is an exploded perspective view of a mold in accordance with the invention, with parts shown in section.
Figure 2:
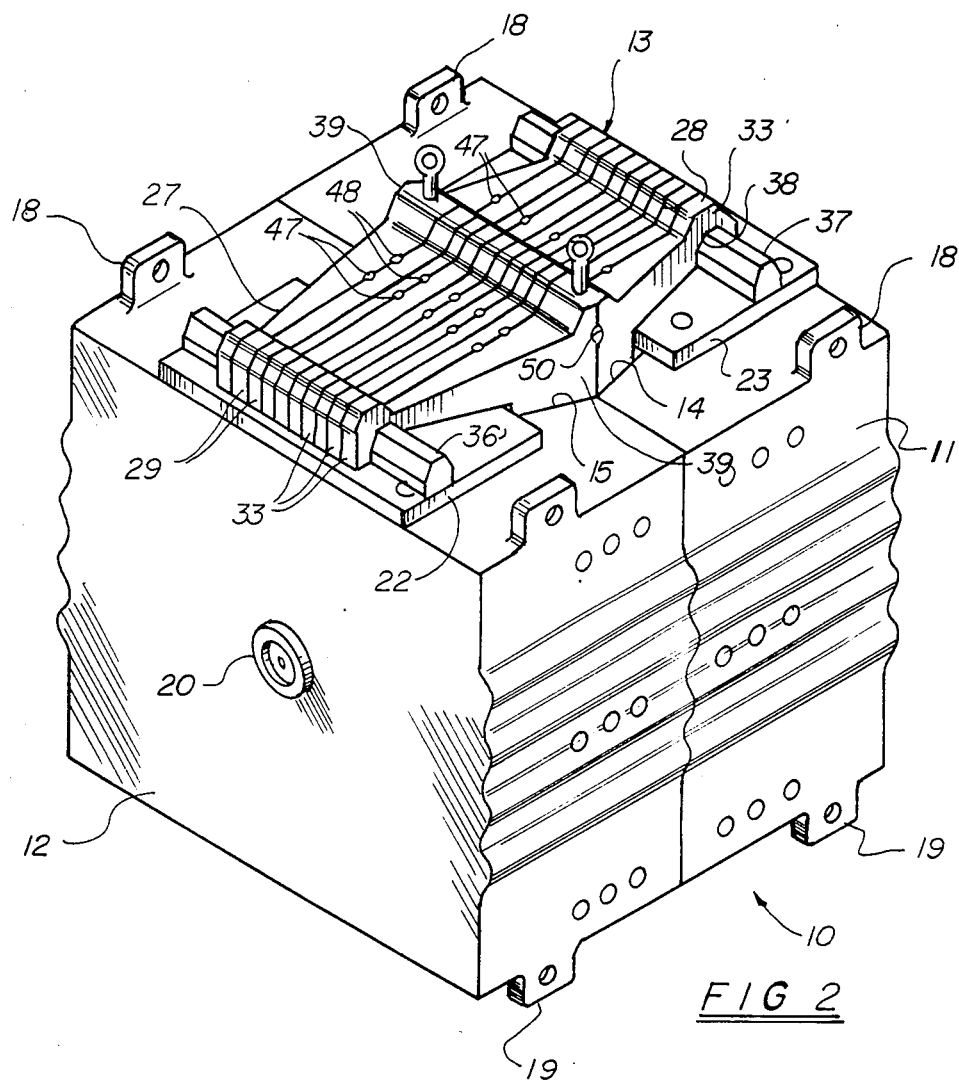
FIG. 2 is a perspective view of the mold of FIG. 1, showing the mold halves moved together.
Figure 3:
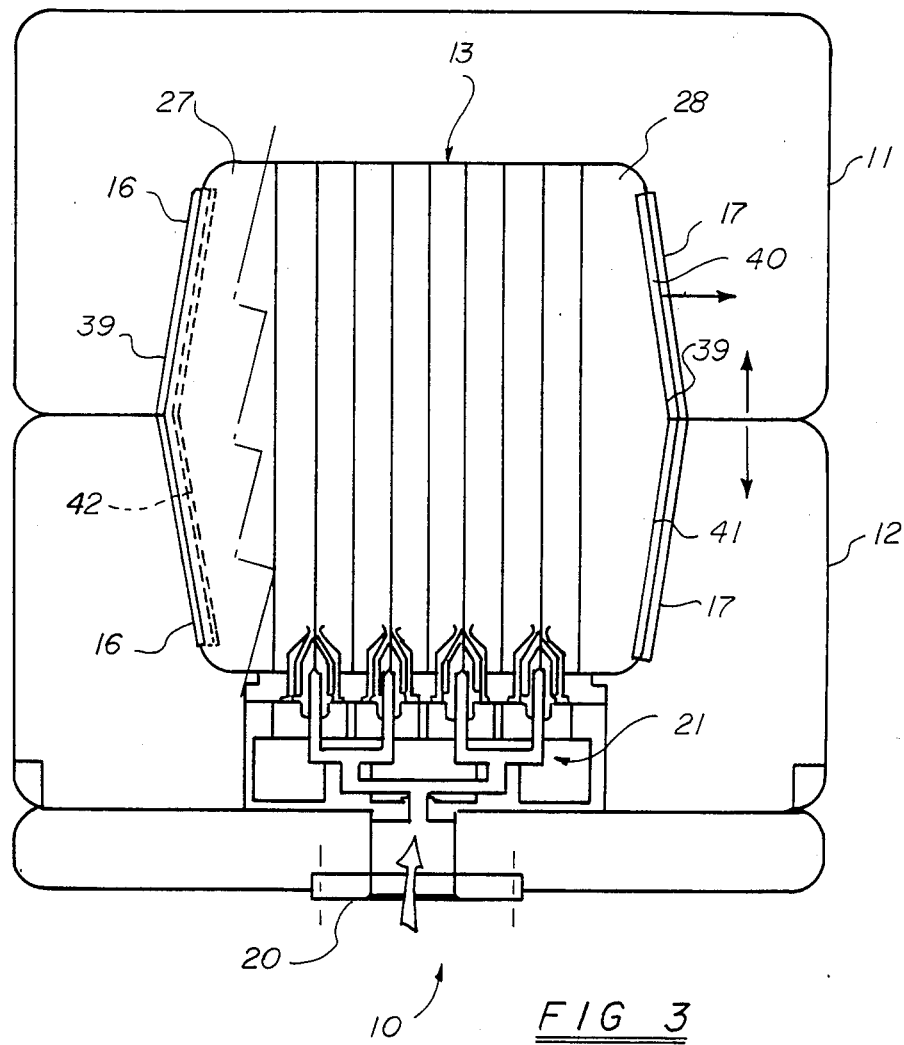
FIG. 3 is a schematic top view of the mold of the invention, showing the wear plates at the right hand side and the tongue and groove arrangement at the left hand side.

Referring more particularly to the drawings, a mold in accordance with the invention is shown generally at 10 in FIGS. 1 through 3 and comprises mold halves (bolsters) 11 and 12 adapted to move toward and away from one another along an axis of movement indicated by arrow A, and recessed at their facing surfaces for receiving a plurality or stack of mold plates 13 arranged parallel to one another and parallel to the axis of movement of the mold halves.

The inner surfaces 14 and 15 of each mold half are tapered or wedge-shaped, opening toward the opposite mold half, and have a plurality of tongue members 16 thereon. Wear plates 17 are secured on the tapered surfaces. Combination eyebolt/feet members 18/19 are formed on each mold half, and an inlet 20 for the plastic material is provided in the back of one of the mold halves. This inlet communicates with a system of nozzles 21 arranged to feed plastic material into the mold cavities between the plates.

Program plates 22 and 23 are secured on the top surfaces of the mold halves, and shaped guide channels 24, 25 and 26 are formed in the upper surfaces of the program plates. Corresponding plates (not shown) are secured on the bottoms of the mold halves.

The assembly or stack 13 of mold plates includes a pair of slides 27 and 28 on opposite sides of a plurality of pairs of mold plates 29, 30 and 31, with the mold plates in each pair defining one or more mold cavities 32 therebetween. As seen best in FIGS. 1, 2, 8 and 9, the upper end edge portions of the mold plates are formed as hangers 33. The bottom end edge portions are extended at 34 to form guide members, and roller bearings 35 are provided on both the hangers 33 and the guide extensions 34. When the mold is assembled, the roller bearings ride in the guide channels 24, 25 and 26, resulting in programmed opening and closing of the mold plates as the mold halves move toward and away from one another.

Plate bars 36 and 37 rest on top of the program plates and extend across the width of the assembled stack 13 of mold plates. The plate bars are trapezoidal in transverse cross-section, and the underside of the hanger extremities have correspondingly shaped notches 38 in which the plate bars are received. Thus, the mold plates are all held in alignment by the plate bars as the mold is operated. The trapezoidal cross-section enables easy removal and placement of the hangers on the plate bars.

The slides 27 and 28 have thickened midportions 39 defining oppositely sloping surfaces 40 and 41 having a taper corresponding to the taper of the surfaces 14 and 15 of the mold halves. The surfaces 40 and 41 have grooves 42 therein for receiving the tongues 16 on the mold halves. Thus, as the mold halves move away from each other, the slides are moved outwardly away from one another, making room for the mold plates to separate under the influence of the guide channels in the program plates.

Figures 4, 5:
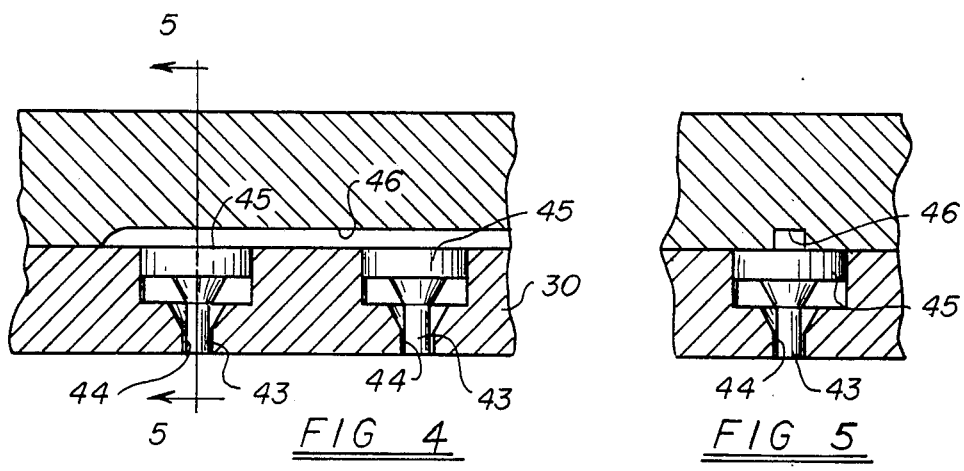
FIG. 4 is an enlarged, fragmentary sectional view of a part of the ejector system of the invention.
FIG. 5 is a view in section taken along line 5—5 in FIG. 4.

An ejector system for ejecting the molded parts is shown best in FIGS. 4 and 5 and comprises a plurality of ejector pins 43 reciprocable in openings 44 in the mold plates and driven by pistons 45. Air channels 46 communicate with the pistons and during an injection cycle vacuum is applied to the pistons to keep them retracted. This vacuum also bleeds around the pistons and pins and serves to vacuum vent the mold cavities. When a molding cycle is completed, compressed air is applied to the channels to force the pistons forward, urging the pins into contact with the molded parts to eject them. Compressed air (or vacuum) is applied to the channels via air inlets 47 at the top of the mold plate stack as seen in figures 1 and 2. Pulsating ejection action can be achieved by alternating positive and negative pressure through venturis 48. In addition, each level of ejectors can be programmed individually as required for each part by controlling compressed air and vacuum through the venturis.

An air jet or air blast tube 49 is positioned in an opening 50 extending through the top portions of the mold stack and has a plurality of circumferentially extending slots 51 therein in positions to be located between the mold plates when they are separated, whereby a fan shaped discharge of air may be directed against the molded part to "slice" or lift the part away from the mold plate and accelerate its downward motion from the cavity. The tube 49 remains stationary while the mold plates open and close.

Adjustable air inlets 52 in the edges of the mold plates communicate with cooling and/or heating channels 53 in the backs of the mold plates to heat and/or cool the plates as desired. With this arrangement, selective heating or cooling of portions of the mold plates can be attained.

The arrangement of the stack mold of the invention permits all injection methods to be used. Thus, injection may be: direct with surface runners; hot runner; insulated runner and insulated with surface runner. The cooled base in the mold of the invention permits cooling of surface runners The slides and mold halves are made of specially hardened steel, and wear plates (RC) are on all inside faces of the mold. The mold plates are made of special "Emerald" stainless steel prehardened to 32 RC to produce a mirror like surface ideal for thin part accuracy and finish.

The trapezoidal plate bars 36 and 37 are made of specially hardened steel and guide the mold plates in simultaneous motion along the top of the program plates, ensuring that no wear is exerted on the plates.

In use, molten material from the press nozzle is introduced through the opening 20 in the back of the mold and channeled to the "wall" created by the section of the mold plates. A series of channels or runners are engraved on either the section of the mold plates or on a "back plate" located within the injection half of the mold and which comes directly in contact with the mold plates when the mold closes. These runners channels the material to whatever openings or gates need to be located between the plates to convey the material to the parts to be produced. A variety of intermediate "relays" cn be incorporated into the injection half of the mold to assist the molten material to be distributed in a thermally balanced manner to the different runners and gates. Such systems are presently used in conventional molds.

The program plates on the top and bottom of each mold half serve as wear plates for the plate bars in addition to acting as a program for the separation of the mold plates at the end of an injection cycle. The program plates also act as a support for the mold plates and prevent them from falling. In this connection, the eyebolts on the tops of the slides may be secured over press tie bars to prevent dropping of the mold plate block in case the press opens beyond the plate hangers.

The unique arrangement of the mold plates parallel to the axis of movement of the mold halves enables a much greater number of mold plates to be used in a given size press for thereby molding a larger number of large flat articles than can be molded in conventional presses wherein the mold plates are arranged perpindicular to the axis of movement. The shaped sides of the mold halves cooperate with complementally shaped surfaces on the mold plates to wedge the plates toward one another during closing movement of the press, and the guides on the mold plates and mold halves cause the mold plates to separate from one another or open during opening movement of the press.

While this invention has been illustrated and described in detail, it is to be understood that various changes in the structure may be made without departing from the scope of the invention as defined in the appended claims, and all functional and structural equivalents are intended to be covered.

Having thus described the invention, what is claimed is:

1. A stack mold, comprising:
a pair of mold halves arranged to move toward and away from one another along an axis of movement between platens of a press;
a plurality of mold plates arranged in a stack between the mold halves, said mold plates being disposed in planes substantially parallel to the axis of movement of said mold halves; and
said mold plates and mold halves having shaped surfaces formed thereon such that a wedging action is exerted on the mold plates as the mold halves close toward one another, thereby pressing the mold plates together.

2. A stack mold, comprising:
a pair of mold halves arranged to move toward and away from one another along an axis of movement between platens of a press;
a plurality of mold plates arranged between the mold halves in planes parallel to the axis of movement;
cooperating means on the mold halves and mold plates for pressing the plates together as the mold halves close toward one another;
said mold halves having mold plate guide means thereon; and
said mold plates having hangers formed integrally therewith for free-hanging support of said mold plates and being supported and guided by said hangers on said mold plate guide means, said mold plates being individually removalbe from said mold without requiring disassembly of said mold halves.

3. A stack mold, comprising:
a pair of mold halves arranged to move toward and away from one another along an axis of movement between platens of a press;
a plurality of mold plates arranged between the mold halves in planes parallel to the axis of movement; and
said mold plates having hangers formed integrally on upper extremities thereof for supporting and guiding the mold plates on the mold halves as the mold halves move toward and away from another, said mold halves having guide means formed thereon for cooperation with the hangers on the mold plates to cause the mold plates to separate from one another as the mold halves move away from one another during opening movement of the press, and said mold plates being individually removeable from the mold without requiring disassembly of the mold halves.

4. A stack mold as claimed in claim 1, wherein:
the mold halves have recessed faces on the opposing surfaces of the mold halves, said recessed faces having tapered sides opening toward the opposite mold half; and
slides are disposed between the mold plates and the tapered sides of the mold halves, said slides having tapered outer faces corresponding to the tapered sides of the mold halves, defining a wedge shape which exerts a force against the mold plates urging them together as the mold halves close toward one another 5. A stack mold as claimed in claim 4, wherein:
a tongue and groove structure is engaged between the tapered sides of the mold halves and the tapered faces of the slides, whereby as the mold halves move away from one another the slides are pulled away from the mold plates enabling them to separate from one another at the end of an injection cycle.

6. A stack mold as claimed in claim 5, wherein:
program plates are supported on the top and bottom surfaces of the mold halves, said program plates having guide surfaces formed thereon; and
said mold plates have hangers formed integrally on the upper extremities thereof, and guide means engaged between the hangers and the guide surfaces of the program plates to guide the mold plates in a predetermined opening and closing sequence

7 as the mold halves move toward and away from one another.

7. A stack mold as claimed in claim 2, wherein:
said mold plate guide means comprise program plates supported on the top and bottom surfaces of the mold halves, said program plates having guide surfaces formed thereon; and
said hangers have guide means thereon engaged with the guide surfaces on the program plates to guide the mold plates in a predetermined opening and closing sequence as the mold halves move toward and away from one another.

8. A stack mold as claimed in claim 3, wherein:
said guide means include program plates supported on the top and bottom surfaces of the mold halves, said program plates having guide surfaces formed thereon; and
said hangers have guide means thereon engaged with the guide surfaces on the program plates to guide the mold plates in a predetermined opening and closing sequence as the mold halves move toward and away from one another.

9. A stack mold as claimed in claim 8, wherein:
the mold halves have recessed faces on the opposing surfaces thereof, said recessed faces having tapered sides opening toward the opposite mold half; and
slides are disposed between the mold plates and the tapered sides of the mold halves, said slides having tapered outer faces corresponding to the tapered sides of the mold halves, defining a wedge shape which exerts a force against the mold plates urging them together as the mold halves close toward one another.

10. A stack mold as claimed in claim 1, wherein:
ejector means are associated with the mold plates to eject molded articles from the mold plates at the end of an injection cycle, said ejector means comprising ejector pins driven by pistons received in openings in the mold plates, and air passages communicating with the pistons for operating the ejector pins; and
control means connected with the air passages for applying a negative pressure to the channels and pistons during an injection cycle to maintain the ejector pins withdrawn and also to vent the mold cavity, and for applying a positive pressure to the pistons to extend the ejector pins at the end of an injection cycle.

11. A stack mold as claimed in claim 10, wherein:
an air blast tube extends through the mold plates in a direction substantially perpendic thereto, said air blast tube having a plurality of slots therein in positions corresponding to the location of the mold cavity when the mold plates are separated at the end of an injection cycle to direct a fan shaped blast of air into the mold cavity and strip the molded part away from the mold plates and accelerate its fall away from the mold cavity.

12. A stack mold as claimed in claim 6, wherein:
an air blast tube extends through the mold plates in a direction substantially perpendicular thereto, said air blast tube having a plurality of slots therein in positions corresponding to the location of the mold cavity when the mold plates are separated at the end of an injection cycle to direct a fan shaped blast of air into the mold cavity and strip the molded part away from the mold plates and accelerate its fall away from the mold cavity.

13. A stack mold as claimed in claim 7, wherein:
an air blast tube extends through the mold plates in a direction substantially perpend thereto, said air blast tube having a plurality of slots therein in positions corresponding to the location of the mold cavity when the mold plates are separated at the end of an injection cycle to direct a fan shaped blast of air into the mold cavity and strip the molded part away from the mold plates and accelerate its fall away from the mold cavity.

14. A stack mold as claimed in claim 9, wherein:
an air blast tube extends through the mold plates in a direction substantially perpendicular thereto, said air blast tube having a plurality of slots therein in positions corresponding to the location of the mold cavity when the mold plates are separated at the end of an injection cycle to direct a fan shaped blast of air into the mold cavity and strip the molded part away from the mold plates and accelerate its fall away from the mold cavity.

15. A stack mold as claimed in claim 11, wherein:
heat exchange channels are formed in the backs of the mold plates for receiving and circulating a heat exchange fluid over the mold plates to heat and cool the plates; and
control means associated with the channels for adjusting the flow of heat exchange fluid in the channels to regulate the amount of heating or cooling in selected portions of the mold plates.

16. A stack mold as claimed in claim 12, wherein:
heat exchange channels are formed in the backs of the mold plates for receiving and circulating a heat exchange fluid over the mold plates to heat and cool the plates; and
control means is associated with the channels for adjusting the flow of heat exchange fluid in the channels to regulate the amount of heating or cooling in selected portions of the mold plates.

17. A stack mold as claimed in claim 13, wherein:
heat exchange channels are formed in the backs of the mold plates for receiving and circulating a heat exchange fluid over the mold plates to heat and cool the plates; and
control means is associated with the channels for adjusting the flow of heat exchange fluid in the channels to regulate the amount of heating or cooling in selected portions of the mold plates.

18. A stack mold as claimed in claim 14, wherein:
heat exchange channels are formed in the backs of the mold plates for receiving and circulating a heat exchange fluid over the mold plates to heat and cool the plates; and
control means is associated with the channels for adjusting the flow of heat exchange fluid in the channels to regulate the amount of heating or cooling in selected portions of the mold plates.

* * * * *